United States Patent
Ambrosini

(10) Patent No.: US 7,219,383 B1
(45) Date of Patent: May 22, 2007

(54) PROCESS FOR CREATING A PAIR OF ATHLETIC SHOES

(76) Inventor: Anthony Ambrosini, 2336 Louis Kossuth Ave., Ronkonkoma, NY (US) 11779

( * ) Notice: Subject to any disclaimer, the term of this patent is extended or adjusted under 35 U.S.C. 154(b) by 343 days.

(21) Appl. No.: 11/005,429

(22) Filed: Dec. 6, 2004

(51) Int. Cl.
*A43D 11/00* (2006.01)

(52) U.S. Cl. .................... 12/142 T; 12/142 P; 36/67 R

(58) Field of Classification Search ............. 12/142 T, 12/142 P, 142 Q; 36/67 D, 67 R, 134
See application file for complete search history.

(56) References Cited

U.S. PATENT DOCUMENTS

| | | |
|---|---|---|
| 202,191 A | 4/1878 | Proctor |
| 234,030 A | 11/1880 | Hadley |
| 788,160 A | 4/1905 | Leadbeater |
| 1,304,616 A | 5/1919 | Smith |
| 2,183,277 A | 12/1939 | Heilhecker |
| 2,640,283 A | 6/1953 | McCord |
| 3,538,628 A | 11/1970 | Einstein, Jr. |
| 3,934,359 A | 1/1976 | Fletcher |
| 4,377,042 A | 3/1983 | Bauer |
| 5,392,537 A | 2/1995 | Goldberg |
| 5,761,833 A * | 6/1998 | McMullin .................. 36/67 D |
| 6,247,251 B1 | 6/2001 | James |
| 6,345,454 B1 | 2/2002 | Cotton |
| 6,598,324 B1 * | 7/2003 | Tsuji .......................... 36/130 |

FOREIGN PATENT DOCUMENTS

| | | |
|---|---|---|
| EP | 0.352.807 | 1/1990 |
| GB | 216.903 | 1/1925 |

* cited by examiner

*Primary Examiner*—Marie Patterson
(74) *Attorney, Agent, or Firm*—Michael I. Kroll

(57) ABSTRACT

Method 10 discloses a process for creating a pair of athletic shoes having cleats thereon. The process is comprised of taking a first pair of athletic shoes 14 and removing a portion of the sole having cleats therein, the selectively removed portion hereinafter referred to as the cleat plate 22. Then taking a second pair of shoes 18 designated by the user for which shoes they desire to have cleats thereon and creating a cavity 30 within the soles of the second pair of shoes, the cavity conforming substantially to the dimensions of the cleat plate 22, and fixedly attaching the cleat plate to the respective sole by means of fasteners 24, 26 such as screws and/or adhesive 28 that bonds to rubber and plastic surfaces.

9 Claims, 9 Drawing Sheets

US 7,219,383 B1

PROCESS FOR CREATING A PAIR OF ATHLETIC SHOES

BACKGROUND OF THE INVENTION

1. Field of the Invention

The present invention relates generally to shoes and, more specifically, to a process for creating a pair of athletic shoes. The process is comprised of taking a first pair of athletic shoes and removing a portion of the sole having cleats therein, the selectively removed portion hereinafter referred to as the cleat plate. Then taking a second pair of shoes designated by the user has a pair of shoes they desire to have cleats thereon and forming an integral part therewith and creating a cavity within the soles of the second pair of shoes, the cavity conforming substantially to the dimensions of the cleat plate, and fixedly attaching the cleat plate to the respective sole by means of fasteners, such as screws and/or adhesive that bonds to rubber and plastic surfaces.

2. Description of the Prior Art

There are other mountable devices designed for footwear. Typical of these is U.S. Pat. No. 202,191 issued to Proctor on Apr. 9, 1878.

Another patent was issued to Hadley, et al. on Nov. 2, 1880 as U.S. Pat. No. 234,030. Yet another U.S. Pat. No. 788,160 was issued to Leadbeater on Apr. 25, 1905 and still yet another was issued on May 27, 1919 to Smith as U.S. Pat. No. 1,304,616.

Another patent was issued to Heilhecker on Dec. 12, 1939 as U.S. Pat. No. 2,183,277. Yet another U.S. Pat. No. 2,640,283 was issued to McCord on Jun. 2, 1953. Another was issued to Einstein, Jr. on Nov. 10, 1970 as U.S. Pat. No. 3,538,628 and still yet another was issued on Jan. 27, 1976 to Fletcher as U.S. Pat. No. 3,934,359.

Another patent was issued to Bauer on Mar. 22, 1983 as U.S. Pat. No. 4,377,042. Yet another U.S. Pat. No. 5,392,537 was issued to Goldberg on Feb. 28, 1995. Another was issued to James on Jun. 19, 2001 as U.S. Pat. No. 6,247,251 and still yet another was issued on Feb. 12, 2002 to Cotton as U.S. Pat. No. 6,345,4554. Another patent was issued to Morrison et al. as U.K. patent No. GB216,903 and another was published on Jul. 28, 1989 to Tong as European Patent Application No. EP 0 352 807

U.S. Pat. No. 202,191

Inventor: David R. Proctor

Issued: Apr. 9, 1878

As an article of manufacture, a tap for boots and shoes, adapted to be rigidly attached to the sole at its forward end, and provided with means, substantially as described, whereby its rear end is held in contact with and permitted to slide on the sole, as set forth.

U.S. Pat. No. 234,030

Inventor: Edison P. Hadley

Issued: Nov. 8, 1880

The curved plate A, having holes a, bars a" d d', rear bar, a', with flange h, the opening c, and the corrugated bars A', stretching across the opening c, as and for the purpose specified.

U.S. Pat. No. 788,160

Inventor: Alfred Leadbeater

Issued: Apr. 25, 1905

The combination with a shoe and with a heel-block permanently connected thereto, of a sole normally constituted for disassemblage therefrom and to interlock at its forward portion with the shoe, said sole having an integral loop at its rear end which loop surrounds and is removably connected to the heel-block and serves to secure the sole upon the shoe.

U.S. Pat. No. 1,304,616

Inventor: Winfield Dexter Smith

Issued: May 27, 1919

The combination with a golf shoe or the like, of a single anti-slipping cleat pivoted on the shoe near the front part of the sole, whereby the wearer can pivot on the cleat while the latter remains anchored.

U.S. Pat. No. 2,183,277

Inventor: Eugene C. Heilhecker

Issued: Dec. 12, 1939

In a shoe, a main insole, an upper lasted to the insole, an outsole along the outer surface of the said main insole, an auxiliary insole, means extending through said main insole and mechanically connecting said auxiliary insole and said outsole, said means comprising undercut projections in one part and sockets on the other part to engage and lock with said projections.

U.S. Pat. No. 2,640,283

Inventor: Joses McCord

Issued: Jun. 2, 1953

In a shoe, a main insole, an upper lasted to the insole, an outsole along the outer surface of the said main insole, an auxiliary insole, means extending through said main insole and mechanically connecting said auxiliary insole and said outsole, said means comprising undercut projections in one part and sockets on the other part to engage and lock with said projections.

U.S. Pat. No. 3,538,628

Inventor: Arthur Einstein, Jr.

Issued: Nov. 10, 1970

Footwear comprising, in combination, an upper portion, including a sole portion, and a replaceable lower thread portion, said upper portion constructed and arranged to at least partially encompass a wearer's foot, said lower thread portion being detachably fixedly secured and held in juxtaposition to said sole portion by separable fastener means having an enlarged head portion and auxiliary holding means of a hook-pile fabric disposed between and about said separable fastener means and said separable fastener means and said auxiliary holding means being positioned on said sole portion and on said lower thread portion.

U.S. Pat. No. 3,934,359

Inventor: John Fletcher

Issued: Jan. 27, 1976

Reinforcing elements for shoe soles and heels, wherein the reinforcing elements are detachably mounted in a spaced configuration to the bottom base of the shoe sole or heel. The reinforcing elements extend the life of the sole or heel, as well as reduce heat build up within the shoe by providing an air cushion beneath the shoe sole.

U.S. Pat. No. 4,377,042

Inventor: Peter Bauer

Issued: Mar. 22, 1983

Athletic shoes with removable outsoles are disclosed. Each upper is designed to fit an individual foot and ankle of a particular wearer and such upper is provided with an insole securely and permanently connected therewith. Each insole terminates along its peripheral margin with one part of a bead-and-recess mechanically detachable locking member. A removable outsole is provided with a surface contacting tread which is selected to not only best match the surface of a particular sports area but also the condition of such surface at a particular time of use. A flexible member is permanently connected with the outsole and terminates along its peripheral margin with the other part of the mechanical locking member. The outsole and the insole are further connected together by mating Velcro and Duallock members, tongues and grooves carried by the outsole and insole in paired relations, and other interlocking means. The forms and shapes of the bead and recess parts of the bead-and-recess mechanically detachable locking member are illustrated and described.

U.S. Pat. No. 5,392,537

Inventor: Jack Goldberg

Issued: Feb. 28, 1995

An article of footwear has a sole with a lower surface and a recess in the lower surface. A turntable is mounted in the recess for rotational movement relative to the sole but joined thereto by projections located in recesses in the sole.

U.S. Pat. No. 6,247,251

Inventor: Brent James

Issued: Jun. 19, 2001

A grind shoe apparatus incorporating a variable friction grind plate complementally received in the recess of the shoe sole and having a downwardly facing trough and an outwardly facing rail with respective slide surfaces for contacting a support surface to slide therealong. Such plate further includes at least one speed control compartment positioned within one of such slide surfaces and having an insert removably carried therein for varying the frictional resistance occurring during sliding maneuvers.

U.S. Pat. No. 6,345,454

Inventor: Johnny Carmichael Cotton

Issued: Feb. 12, 2002

A shoe having a removable sole includes an upper and a removable lower sole. The upper has an upper sole, a heel portion and a toe portion. Upper sole has a plurality of upwardly opening alignment holes. A lock tab is connected to toe portion and forwardly projects therefrom. The removable lower sole has a heel portion and a toe portion. A rearwardly opening slot disposed in toe portion is shaped and dimensioned to receive lock tab. Removable lower sole has a plurality of upwardly protruding alignment pins which are engageable with alignment holes in upper sole. Lower sole is held in place by inserting lock tab into the rearwardly opening slot in the toe and engaging connector to connect heel portion of upper to heel portion of lower sole.

U.K. Patent Number 216,903

Inventor: Walter Morrison

Issued: Jan. 29, 1925

A support for a Louis or like heel comprises a thin plate of metal, horn, or vulcanite curved laterally and longitudinally to correspond to the curves of the breast and waist, almost as broad centrally as to the waist of the shoe, and adapted to be secured by tacks with or without prongs. The plate may be stiffened by longitudinal ridges.

European Patent Publication Number EPO 352 807

Inventor: James Kai Tong

Issued: Jan. 31, 1990

An insert for an athletic shoe is described. The insert is generally used in conjunction with other shoe components to provide additional stability to a shoe sole. The insert member includes a central body and a plurality of insert extensions which extend outwardly from the central body. The extensions may cooperate with lugs of an outsole.

While this footwear may be suitable for the purposes for which they were designed, they would not be as suitable for the purposes of the present invention, as hereinafter described.

SUMMARY OF THE PRESENT INVENTION

The present invention discloses a process for creating a pair of athletic shoes. The process is comprised of taking a first pair of athletic shoes and removing a portion of the sole having cleats therein, the selectively removed portion hereinafter referred to as the cleat plate. Then taking a second pair of shoes designated by the user for which shoes they desire to have cleats thereon and creating a cavity within the soles of the second pair of shoes, the cavity conforming substantially to the dimensions of the cleat plate, and fixedly attaching the cleat plate to the respective sole by means of fasteners such as screws and/or adhesive that bonds to rubber and plastic surfaces.

A primary object of the present invention is to provide a pair of athletic shoes comprised of a user selected pair of shoes and attaching a cleat plate thereto.

Another object of the present invention is to provide a pair of athletic shoes comprised of a composite pair of shoes from a first and second pair of shoes.

Yet another object of the present invention is to provide a pair of athletic shoes consisting of a favored pair of user's shoes wherein the user is desirous of having cleats thereon.

Still yet another object of the present invention is to provide a pair of athletic shoes wherein a user selects a pair of shoes having cleats and removes a portion of the sole containing the cleats.

Another object of the present invention is to provide a second pair of shoes modified to receive the cleat portion from the first pair of shoes by creating a cavity within the sole of the second pair of shoes.

Yet another object of the present invention is to provide a second pair of athletic shoes wherein the cavity conforms substantially to the dimensions of the removed cleat portion.

Still yet another object of the present invention is to provide a second pair of athletic shoes wherein the cleat plate is fastened within the created cavity.

Another object of the present invention is to provide a second pair of athletic shoes wherein the cleat plate is fastened by means of screws, along with an adhesive that bonds to rubber and plastic surfaces.

Yet another object of the present invention is to provide a pair of athletic shoes comprised of a favored pair of shoes that the user chooses to convert into an athletic pair of shoes by taking a pair of shoes having cleats and removing a portion of the sole having a plurality of cleats therein and fixedly attaching the cleat plate to the favored pair of shoes.

Still yet another object of the present invention is to provide a process whereby an athletic pair of shoes can be created using a pair of shoes having cleats, removing them and attaching the removed portion to another pair of shoes.

Additional objects of the present invention will appear as the description proceeds.

The present invention overcomes the shortcomings of the prior art by providing a process for creating a pair of athletic shoes comprised of a pair of shoes not having cleats and fixedly attaching cleats thereto. The process is comprised of taking a first pair of athletic shoes and removing a portion of the sole having cleats therein forming a cleat plate. Then taking a second pair of shoes selected by the user has a pair of shoes they desire to have cleats thereon and forming an integral part therewith and creating a cavity within the soles of the second pair of shoes, the cavity conforming substantially to the dimensions of the cleat plate, and fixedly attaching the cleat plate to the respective sole by means of fasteners, such as screws, along with an adhesive that bonds to rubber and plastic surfaces.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
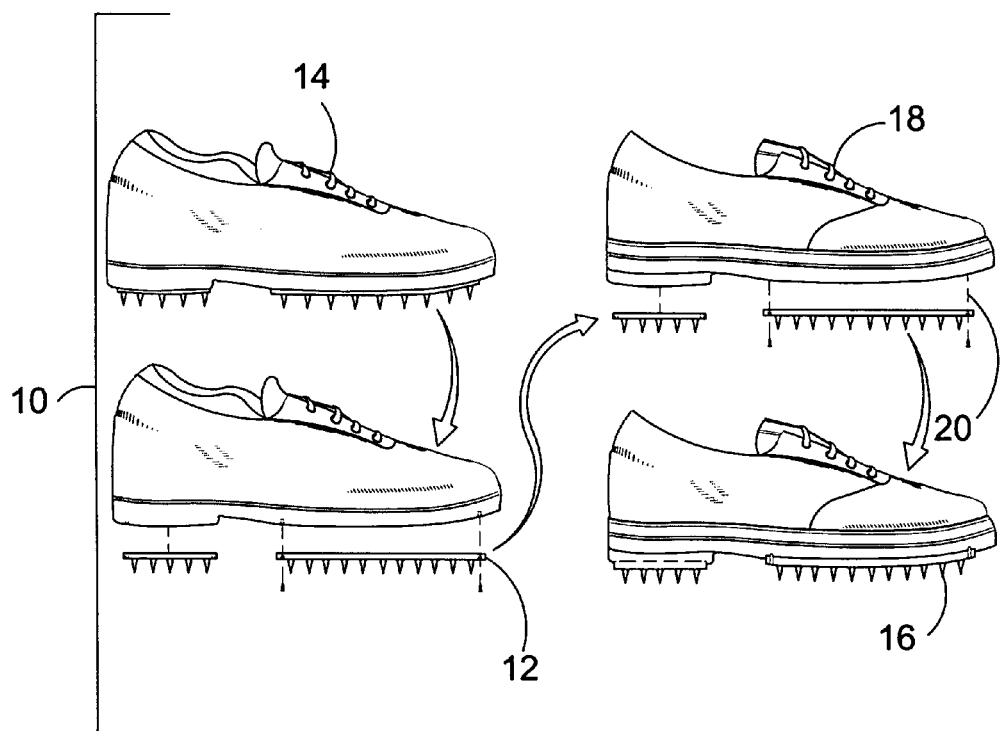
FIG. 1 is an illustrated view of the process of the present invention.

With regard to reference numerals used, the following numbering is used throughout the drawings.

10 present invention
12 cleat plate removal
14 first shoes
16 cleat plate attachment
18 second shoes
20 cavity being formed
22 cleat plate
24 nut
26 screw
28 adhesive
30 cavity

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrated view of the process of the present invention 10. The present invention 10 discloses a process for mating a cleat plate to a sneaker, the process comprising removal 12 of a cleat plate from a first pair of cleated shoes 14 and attachment 16 of the cleat plate to a second pair of shoes 18, the second pair of shoe or sneaker having a cavity formed therein 20 with the cleat plate fastened thereto by means of nylon fasteners, along with an adhesive that bonds to rubber and plastic surfaces.

Figure 2:
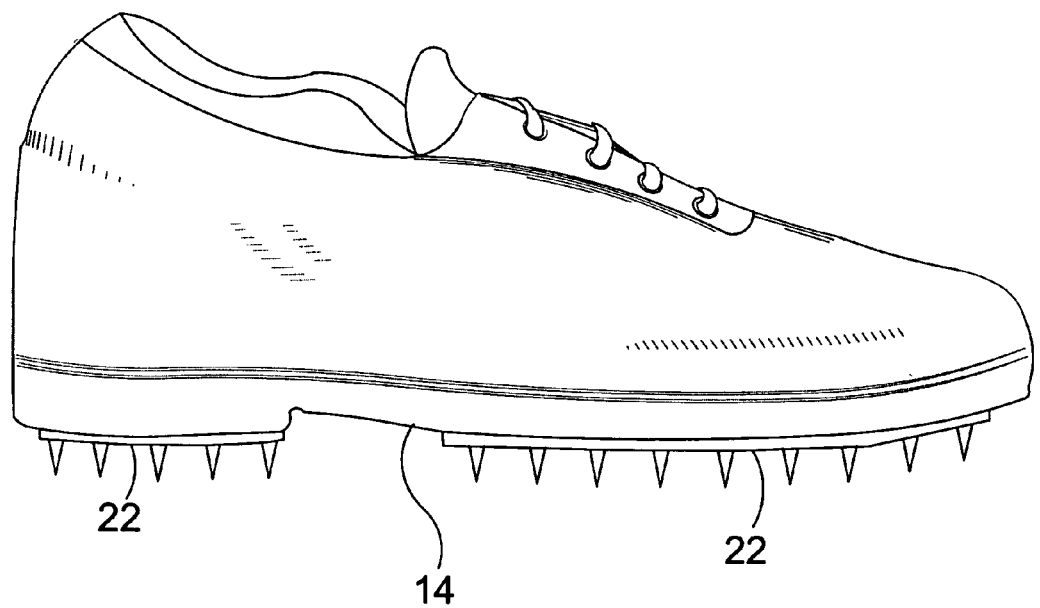
FIG. 2 is a side view of the first step of the process of the present invention.

Turning to FIG. 2, shown therein is a side view of the first step of the process of the present invention. Shown is the present invention 10 disclosing a process for mating a cleat plate to a sneaker, the process comprising removal of a cleat plate 22 from a first pair of shoes 14 and attachment to a second pair of shoes, the second pair of shoe or sneaker having a cavity formed therein with the cleat plate fastened thereto of nylon fasteners, along with an adhesive that bonds to rubber and plastic surfaces.

Figure 3:
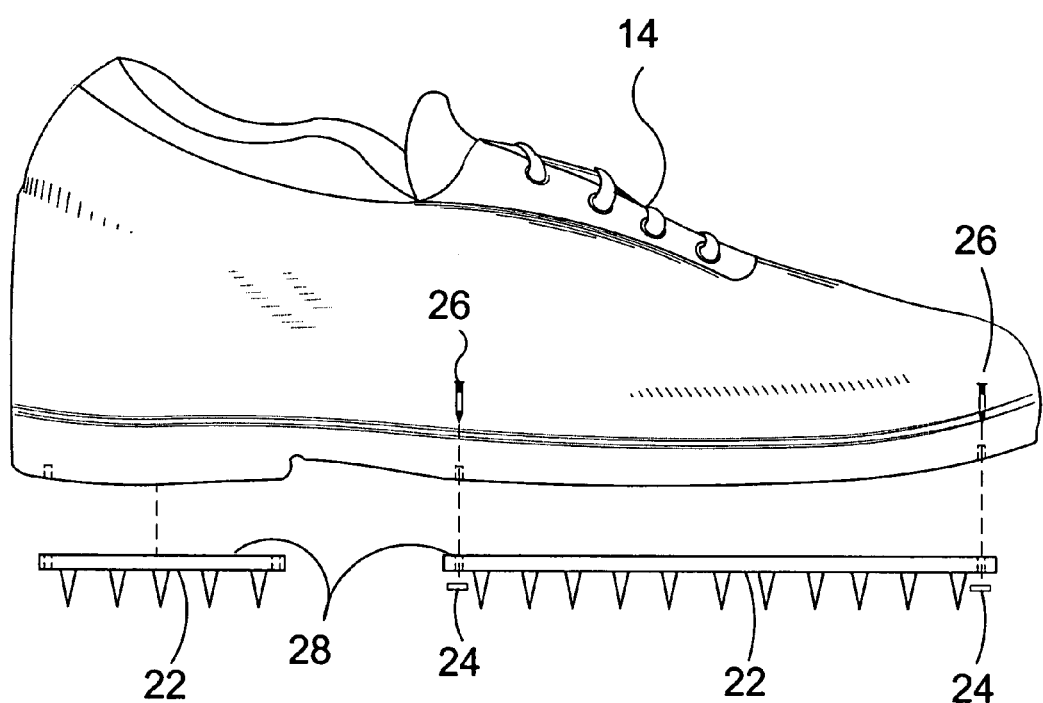
FIG. 3 is a side view of the second step of the process of the present invention.

Turning to FIG. 3, shown therein is a side view of the second step of the process of the present invention. Shown is the present invention 10 disclosing a process for mating a cleat plate to a sneaker, the process comprising removal of a cleat plate 22 from a first pair of shoes 14 and attachment to a second pair of shoes, the second pair of shoe or sneaker having a cavity formed therein with the cleat plate fastened thereto by means of mating nylon fasteners, e.g., a nut 24 and screw 26 made of nylon, along with an adhesive 28 that bonds to rubber and plastic surfaces.

Figure 4:
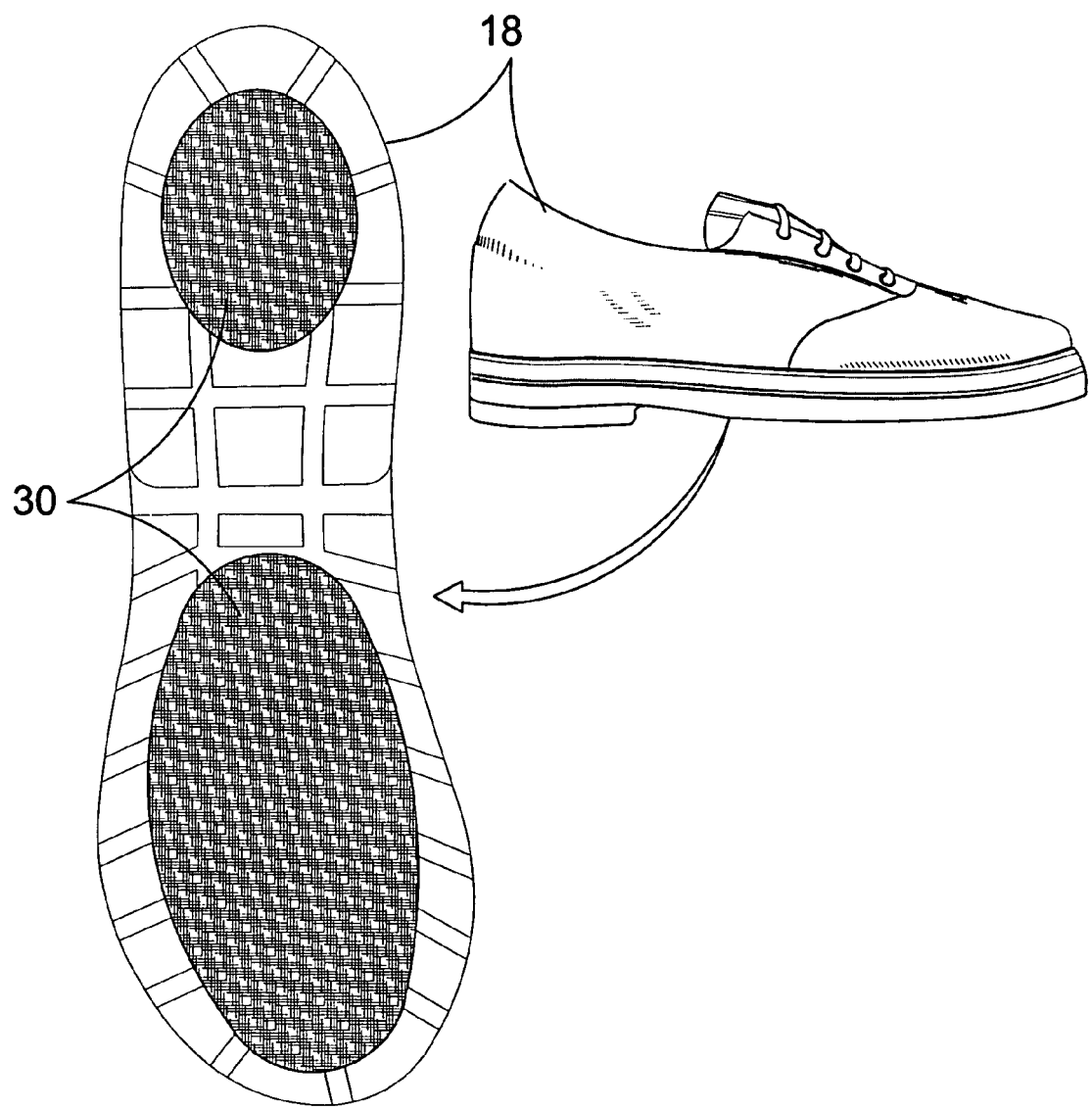
FIG. 4 is a view of the third step of the process of the present invention.

Turning to FIG. 4, shown therein is a view of the third step of the process of the present invention. Shown is the present invention disclosing a process for mating a cleat plate to a sneaker, the process comprising removal of a cleat plate from a first pair of shoes and attachment to a second pair of shoes 18, the second pair of shoe or sneaker having a cavity 30 formed or cut into the bottom of the sole of the shoe with the cleat plate being fastened thereto by means of nylon fasteners, along with an adhesive that bonds to rubber and plastic surfaces.

Figure 5:
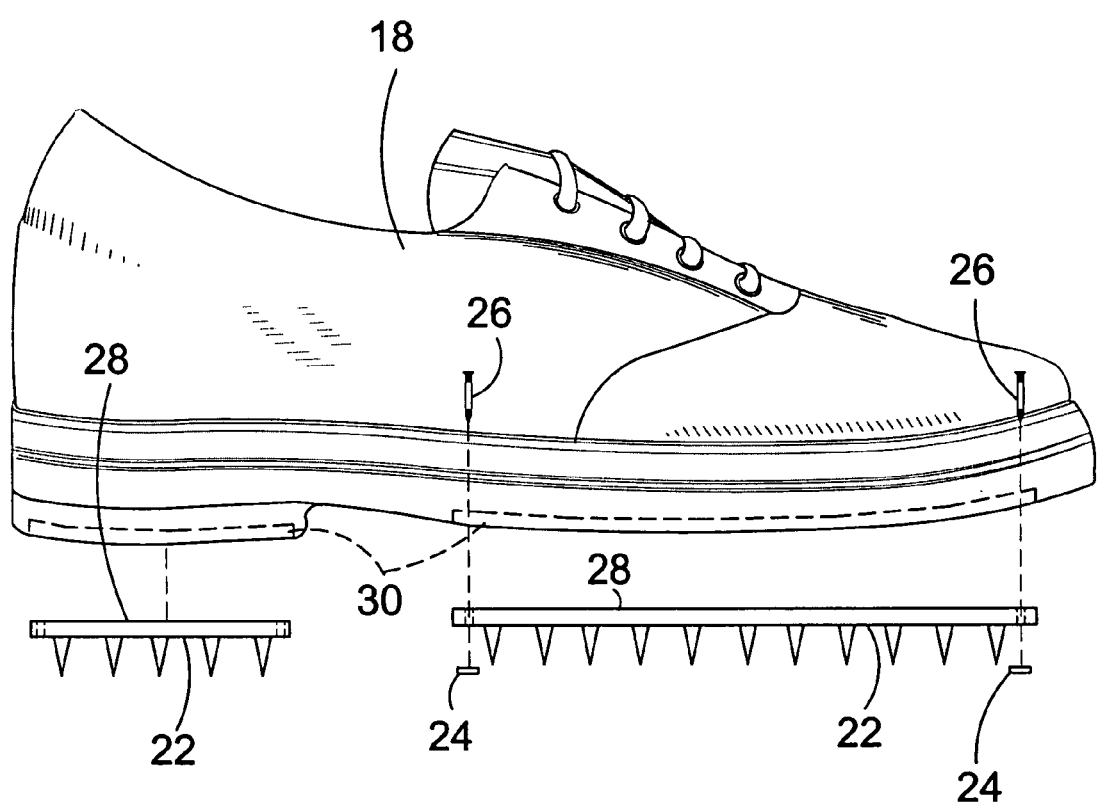
FIG. 5 is a side view of the fourth step of the process of the present invention.

Turning to FIG. 5, shown therein is a side view of the fourth step of the process of the present invention. Shown is the present invention disclosing a process for mating a cleat plate 22 to a sneaker, the process comprising removal of a cleat plate from a first pair of shoes and attachment to a second pair of shoes 18, the second pair of shoe or sneaker having a cavity 30 formed therein with the cleat plate fastened thereto by means of nylon fasteners 24, 26, along with an adhesive 28 that bonds to rubber and plastic surfaces.

Figure 6:
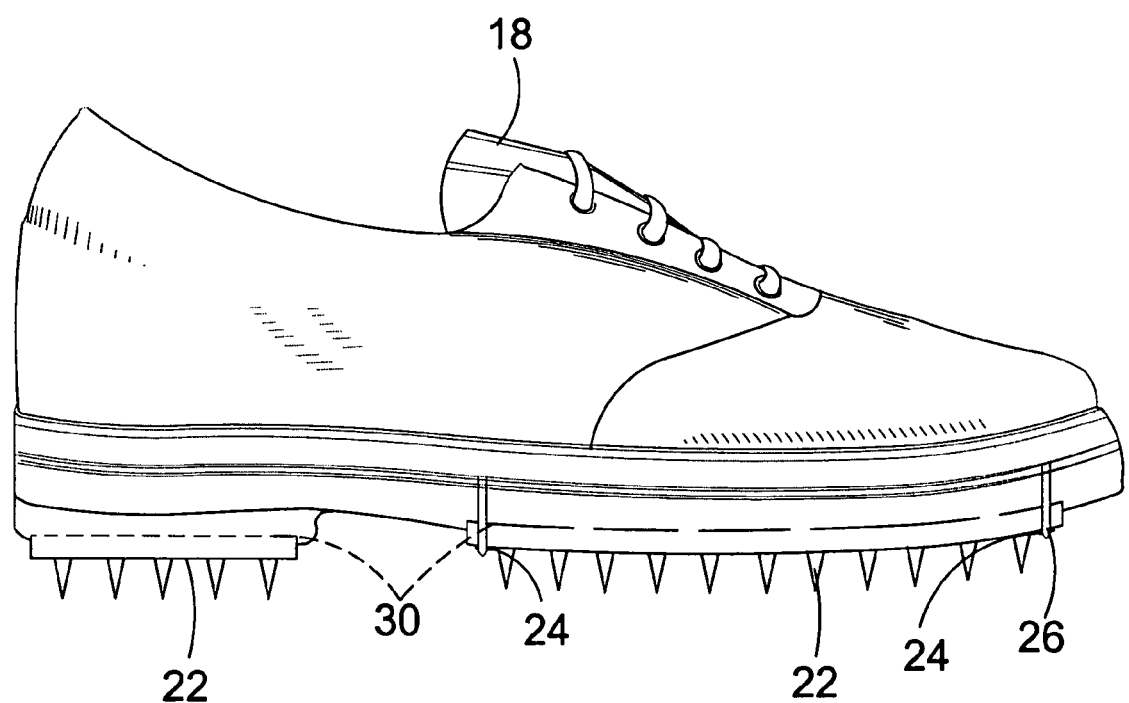
FIG. 6 is a side view of the fifth step of the process of the present invention.

Turning to FIG. 6, shown therein is a side view of the fifth step of the process of the present invention. Shown is the present invention 10 disclosing a process for mating a cleat plate 22 to a sneaker, said process comprising removal of a cleat plate from a first pair of shoes and attachment to a second pair of shoes 18, the second pair of shoe or sneaker having a cavity 30 formed therein with the cleat plate fastened thereto by means of nylon fasteners 24, 26, along with an adhesive that bonds to rubber and plastic surfaces.

Figure 7:
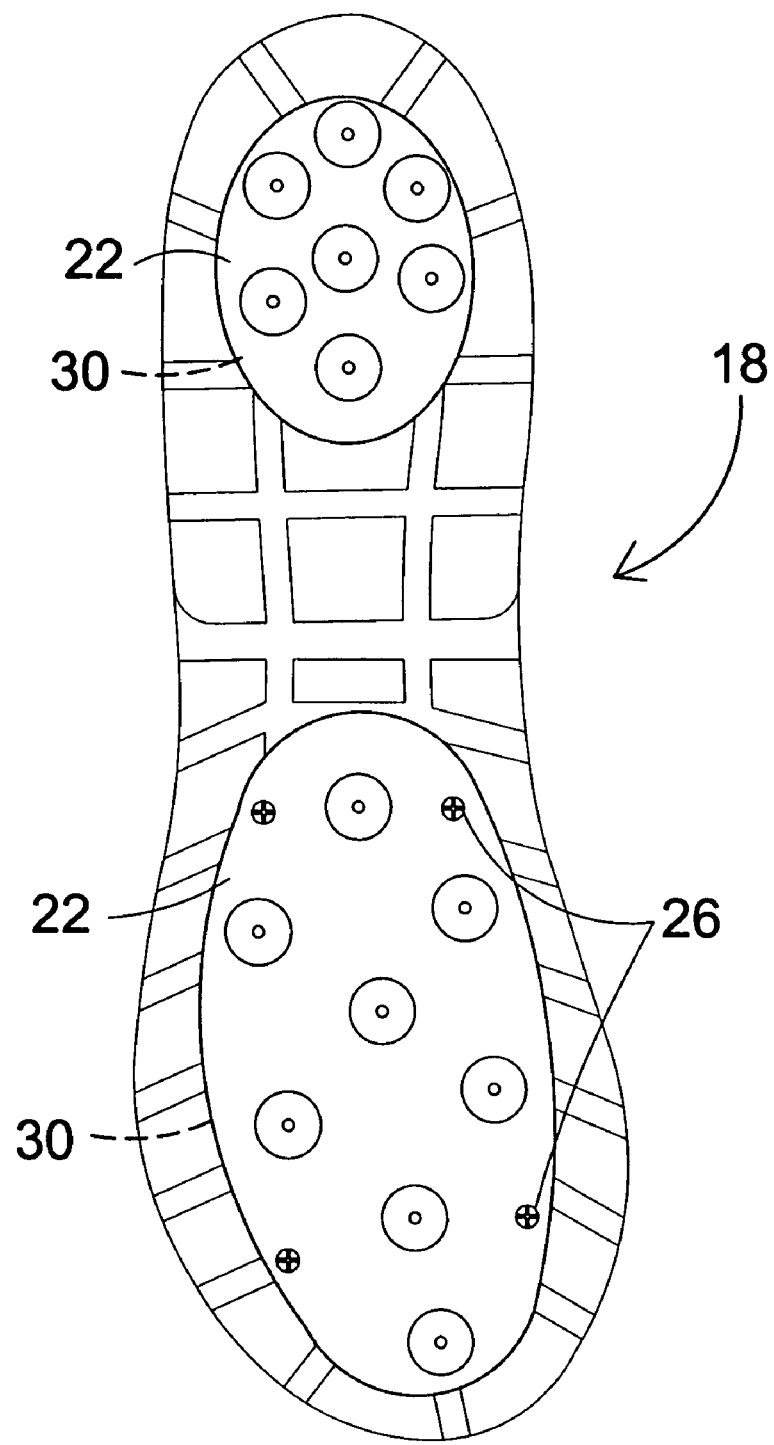
FIG. 7 is a bottom view of the process of the present invention.

Turning to FIG. 7, shown therein is a bottom view of the process of the present invention. Shown is the present invention disclosing a process for mating a cleat plate 22 to a sneaker, the process comprising removal of a cleat plate from a first pair of shoes and attachment to a second pair of shoes 18, the second pair of shoe or sneaker having a cavity 30 formed therein with the cleat plate fastened thereto by means of nylon fasteners 26, along with an adhesive that bonds to rubber and plastic surfaces.

Figure 8:
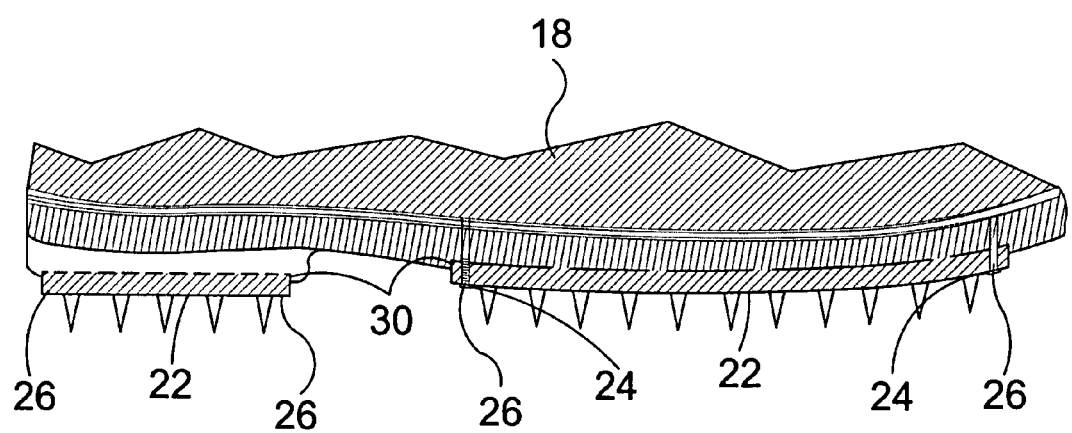
FIG. 8 is a sectional view of the process of the present invention.

Turning to FIG. 8, shown therein is a sectional view of the process of the present invention. Shown is the present invention 10 disclosing a process for mating a cleat plate 22 to a sneaker, the process comprising removal of a cleat plate from a first pair of shoes and attachment to a second pair of shoes 18, the second pair of shoe or sneaker having a cavity 30 formed therein with the cleat plate fastened thereto by means of nylon fasteners 24, 26, along with an adhesive that bonds to rubber and plastic surfaces.

Figure 9:
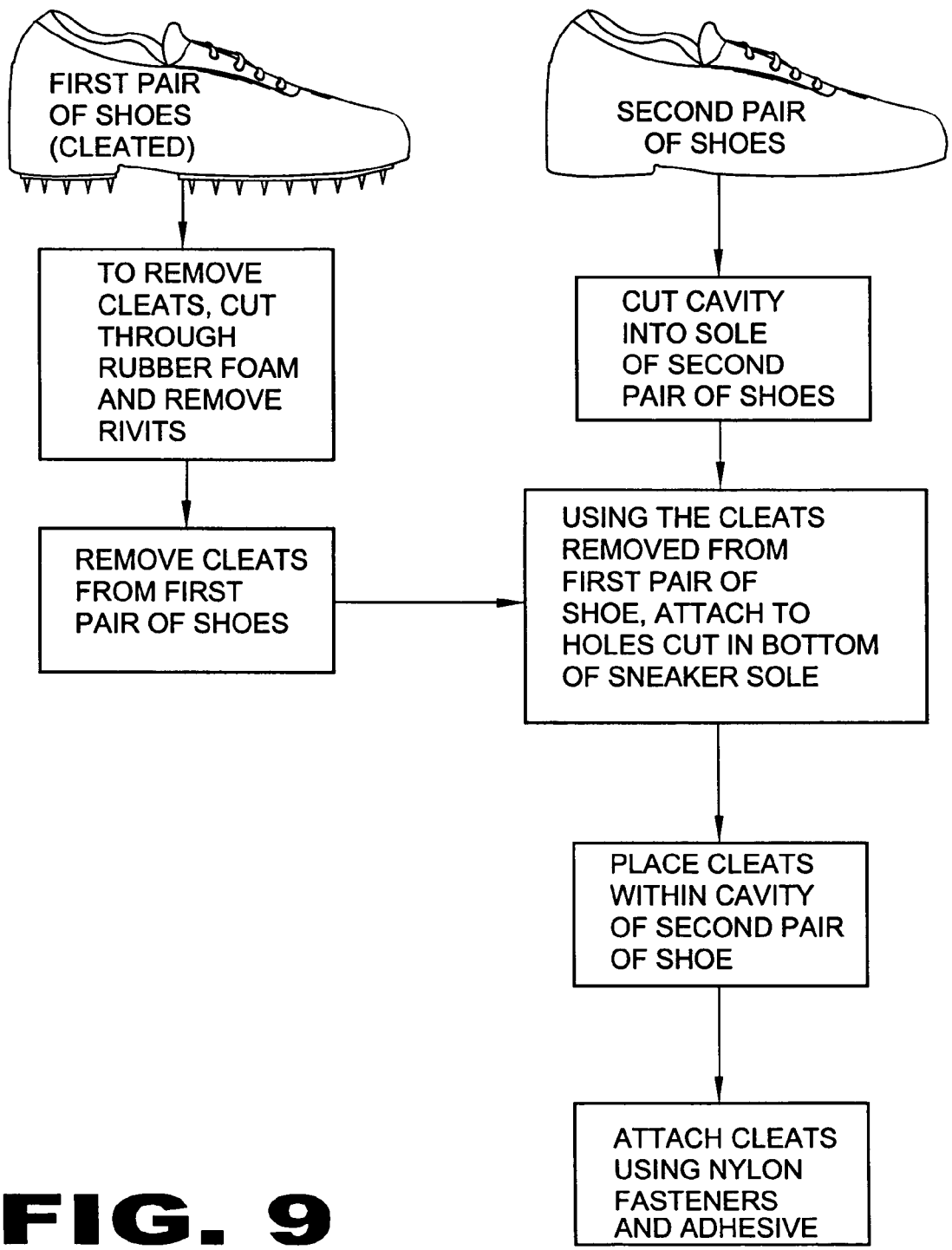
FIG. 9 is a flow chart of the process of the present invention.

Turning to FIG. 9, shown therein is a flow chart of the process of the present invention. Shown is the present invention disclosing a process for mating a cleat plate to a sneaker, the process comprising removal of a cleat plate from a first pair of shoes and attachment to a second pair of shoes, the second pair of shoe or sneaker having a cavity formed therein with the cleat plate fastened thereto by means of nylon fasteners, along with an adhesive that bonds to rubber and plastic surfaces. The steps of the process are summarized as follows: 1) remove cleats by cutting through rubber foam and removing rivets and then removing cleats from first pair of shoes; 2) cut cavity into sole of second pair of shoes; 3) using the cleats removed from first pair of shoe to mate to holes cut in bottom of sneaker sole and place cleats within cavity of second pair of shoes; and 4) attach cleats using nylon fasteners and adhesive.

I claim:

1. A method for forming a pair of athletic shoes having cleats thereon, comprising the steps of:
    a) providing a first pair of athletic shoes having cleats thereon;
    b) removing the cleats from the first pair of shoes;
    c) providing a second pair of athletic shoes;
    d) cutting a cavity in the sole of the second pair of athletic shoes, the cavity for receiving the cleats removed from the first pair of athletic shoes; and,
    e) attaching the cleats removed from the first pair of athletic shoes to the second pair of athletic shoes.

2. The method of claim 1, further comprising the step of conforming the cavity to the size and shape of the cleats removed from the first pair of athletic shoes so that the removed cleats fit within the cavity.

3. The method of claim 2, further comprising the step of using screws and mating nuts for attaching the cleats to the second pair of athletic shoes.

4. The method of claim 3, further comprising the step of using adhesive for attaching the cleats to the second pair of athletic shoes.

5. A method for forming a pair of athletic shoes having cleats thereon, comprising the steps of:
    a) providing a first pair of athletic shoes having front sole cleats and heel cleats thereon;
    b) removing the front and heel cleats from the first pair of athletic shoes to produce a front and heel cleat plate;
    c) providing a second pair of athletic shoes for receiving the front and heel cleat plate;
    d) cutting a front cavity and a heel cavity in the sole of the second pair of athletic shoes, the front and heel cavities for receiving the front and heel cleat plates removed from the first pair of athletic shoes; and,
    e) attaching the front and heel cleat plates removed from the first pair of athletic shoes to the soles of the second pair of athletic shoes.

6. The method of claim 5, further comprising the step of conforming the front and heel cavities to the size and shape of the front and heel cleats removed from the first pair of athletic shoes so that the removed front and heel cleats fit within the front and heel cavity.

7. The method of claim 6, further comprising the step of using screws and mating nuts for attaching the front and heel cleats to the second pair of athletic shoes.

8. The method of claim 7, further comprising the step of using adhesive for attaching the front and heel cleats to the second pair of athletic shoes.

9. The method of claim 6, further comprising the step of removing the front and heel cleats from the first pair of athletic shoes by cutting through the sole of the first pair of athletic shoes and removing the fasteners from the front and heel cleats to produce a front and heel cleat plate.

* * * * *